United States Patent [15] 3,705,521
Smith [45] Dec. 12, 1972

[54] DUAL PATH POWER TRANSMISSION
[72] Inventor: Marion D. Smith, Indianapolis, Ind.
[73] Assignee: General Motors Corporation, Detroit, Mich.
[22] Filed: Dec. 20, 1968
[21] Appl. No.: 789,648

[52] U.S. Cl............................................74/759
[51] Int. Cl.............................................F16h 57/10
[58] Field of Search......................74/759, 761, 763

[56] References Cited

UNITED STATES PATENTS

| | | | |
|---|---|---|---|
| 2,159,427 | 5/1939 | Dunn | 74/759 |
| 2,856,794 | 10/1958 | Simpson | 74/763 |
| 3,067,632 | 12/1962 | Foerster et al. | 74/759 |
| 3,267,769 | 8/1966 | Tuck et al. | 74/759 |

FOREIGN PATENTS OR APPLICATIONS

| | | | |
|---|---|---|---|
| 743,814 | 1/1956 | Great Britain | 74/759 |

Primary Examiner—Carlton R. Croyle
Assistant Examiner—Thomas C. Perry
Attorney—E. W. Christen and A. M. Heiter

[57] ABSTRACT

Disclosed herein is a power transmission having two planetary gear groups, one of which is selectively connectable between the torque converter and the output shaft to provide a single power path and the other, a three speed unit, is selectively connectable between the torque converter and the first planetary group to provide a plurality of dual power paths when operated in conjunction with the first planetary group. The two planetary groups may be operated together to provide two reverse drive ratios. A third planetary group, located between the first planetary group and the transmission output, when operated in conjunction with the first planetary group, provides an additional reverse ratio.

12 Claims, 2 Drawing Figures

PATENTED DEC 12 1972

3,705,521

INVENTOR.
Marion D. Smith
BY
a.m. Heiter
ATTORNEY 3,705,521

DUAL PATH POWER TRANSMISSION

This application is a continuation of Ser. No. 590,020, filed Oct. 27, 1966, now abandoned.

This invention relates to variable speed power transmissions and more specifically to power transmissions for use in trucks.

This transmission has a torque converter and two planetary gear units. One of the planetary gear units is connected between the torque converter and the driven shaft to provide a single power path low speed drive. The other planetary gear unit, having at least three speed ratios, is connected between the torque converter and the first mentioned planetary unit to provide dual power paths in both forward and reverse drives, and including a one to one forward drive ratio. An additional planetary gear unit may be used in conjunction with the first mentioned planetary gear unit to provide more complete reverse drive ratio coverage.

It is an object of this invention to provide an improved ratio changing power transmission having at least four forward speed ratios.

Another object of this invention is to provide an improved power transmission having dual paths of power flow from the input shaft to the driven shaft.

Another object of this invention is to provide an improved power transmission having two planetary gear groups operatively connected between a drive shaft and a driven shaft thereby providing a plurality of single paths and dual paths of power transmission.

A further object of this invention is to provide an improved multiratio power transmission having a first planetary gear group, having an input member, an output member and another member, connected between the drive and the driven shaft providing a lower forward speed ratio, a second planetary gear group, having a plurality of input members, output members and reaction members, connected to the drive shaft providing three forward speed ratios including a one to one ratio and two reverse speed ratios when driven in combination with the first planetary gear group, and a third planetary gear group having input, output and reaction members, connected between the first planetary gear group and the driven shaft providing a reverse speed ratio when driven in combination with the first planetary gear group.

These and other objects of the invention will be more apparent from the following description and drawings of the preferred embodiments of the invention.

Figure 1:
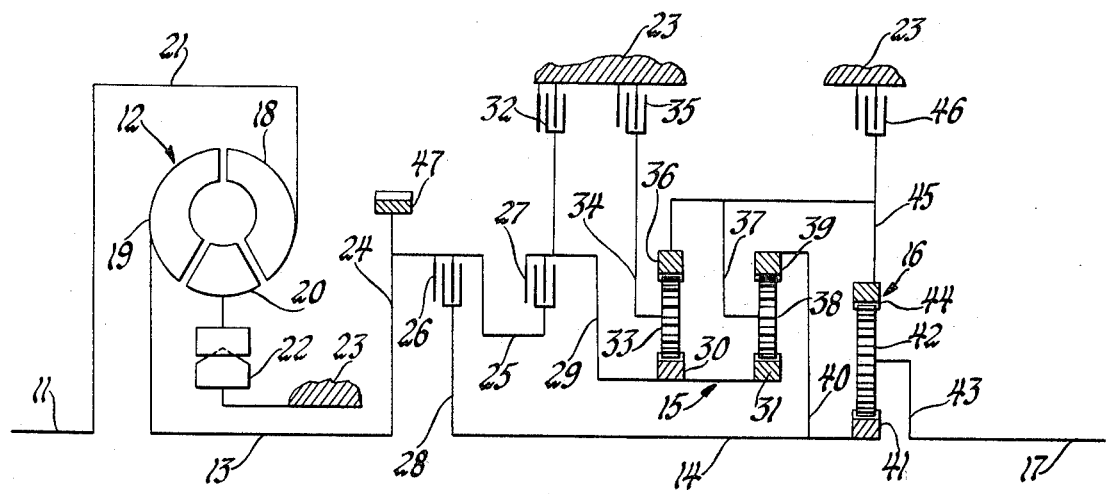
FIG. 1 is a diagrammatic view of the transmission.

Referring to FIG. 1 the transmission includes in general an input shaft 11 connected to an engine, not shown, a torque converter 12, a drive shaft 13, an intermediate shaft 14, a first planetary gear group or unit 15, a second planetary gear group or unit 16, and a driven shaft 17. The torque converter 12 has an impeller 18, a turbine 19, and a stator 20. The input shaft 11 is connected to the impeller 18 by a rotatable housing 21. The torque converter 12 operates in a conventional manner. The impeller 18, rotated by the input shaft 11, imparts energy to the fluid and directs the fluid to the turbine 19. The fluid causes the turbine 19 to rotate in the same direction as the impeller 18. The fluid upon leaving the turbine 19 is redirected by the stator 20 to the impeller 18. The reaction torque on the stator 20 is absorbed by the one-way brake 22 and a stationary part of the transmission case 23.

The turbine 19 is connected to the drive shaft 13 which is attached through annular drums 24 and 25 to clutches 26 and 27. Clutch 26 is connected to the intermediate shaft 14 through an annular drum 28. The clutch 27 is connected to the sun gears 30 and 31 of planetary gear unit 15 through an annular drum 29. The annular drum 29 is also connected to a brake 32. Thus, the sun gears 30 and 31 selectively provide either input or reaction members for the planetary gear group 15.

Considering the planetary gear unit 15 the sun gear 30 meshes with a plurality of planet pinions 33 which are rotatably mounted in a carrier 34. The carrier 34 is connected to a selectively operable brake 35 thus providing a selectively operable reaction member. The planet pinions 33 mesh with a ring gear 36 which is connected to a carrier 37. A plurality of planet pinions 38 are rotatably mounted in carrier 37 and mesh with sun gear 31 and ring gear or input member 39. The ring gear 39 is connected, through an annular rotatable hub 40, to the intermediate shaft 14, thus providing an input member.

The planetary gear unit 16 has a sun gear or input member 41 connected to intermediate shaft 14 and meshing with a plurality of pinions 42. The pinions 42 are rotatably mounted on a carrier or output member 43, which is connected to the driven shaft 17, and mesh with ring gear 44. The ring gear 44 is connected by a drum 45 to a brake 46, carrier 37 and ring gear 36 which carrier and ring gear are output members of planetary gear group 15. The ring gear 44 is a reaction member or an input member depending on whether brake 46 is engaged or disengaged.

The brakes 32, 35 and 46 are of the multiple disc type wherein alternate friction plates are splined to a drum and a stationary member. The clutches 26 and 27 are of the multiple disc type wherein alternate friction plates are splined to an inner and outer drum. The clutches and brakes may be hydraulically actuated so that the clutches will transmit power and the brakes will restrain their associated components from rotation.

A ring gear 47 is secured to drum 24 to be driven by the turbine 19 and the drive shaft 13. The ring gear 47 may be used as an input device to a power take-off unit, not shown. The power take-off unit may be used to power external auxiliary units such as a winch.

When the clutches and brakes are disengaged no power will be transmitted from the drive shaft 13 to the driven shaft 17. To operate the transmission in the first or low forward speed ratio, the clutch 26 and the brake 46 are engaged. The engagement of brake 46 prevents rotation of ring gear 44 thereby establishing a stationary reaction member for planetary gear unit 16. The power flow is in a single path from the input shaft 11 through the torque converter 12, drive shaft 13, drum 24, clutch 26, drum 28, intermediate shaft 14, sun gear 41, planet pinions 42 and carrier 43 to the driven shaft 17. Since the ring gear 44 is stationary, the carrier 43 is driven, under the action of the planet pinions 42, in the same direction as sun gear 41, but at a speed less than the sun gear.

To operate the transmission in the second forward speed ratio, the brake 46 is disengaged and the brake 35 is engaged while the clutch 26 remains engaged. The power flow is in a single path from the input shaft 11 to the intermediate shaft 14, as in the low speed ratio. The power flow is in two paths from intermediate shaft 14 to drive shaft 17. One path is from intermediate shaft 14 through sun gear 41, planet pinions 42 and carrier 43 to drive shaft 17. The other path is from intermediate shaft 14 through hub 40 to ring gear 39 of planetary gear unit 15 wherein carrier 34, held stationary by brake 35, is a reaction member. The power flow through planetary gear unit 15 is in two paths from ring gear 39 to drum 45. One path is from ring gear 39 through planet pinions 38 and carrier 37 to drum 45. The other path is from ring gear 39 through planet pinions 38, sun gear 31, sun gear 30, planet pinions 33 and ring gear 36 to drum 45. The power flow is then from drum 45 through ring gear 44, planet pinions 42 and carrier 43 to driven shaft 17. The ring gear 44 is driven in the same direction as the sun gear 41. As in the low speed ratio, the carrier 43 is driven, under the action of the planet pinions 42, in the same direction as the sun gear 41 and at a speed less than the sun gear. Due to the rotation of ring gear 44, the speed of the carrier 43 is higher than in the low speed ratio.

To operate the transmission in the third forward speed ratio, the brake 35 is disengaged and the brake 32 is engaged while the clutch 26 remains engaged. The power flow is in a single path from the input shaft 11 to the intermediate shaft 14, as in the low speed ratio. From the intermediate shaft 14 to the driven shaft 17, the power flow is in two paths. One path is from intermediate shaft 14 through sun gear 41, planet pinions 42, and carrier 43 to driven shaft 17. The other path is from intermediate shaft 14 through hub 40, ring gear 39, planet pinions 38, carrier 37, drum 45, ring gear 44, planet pinions 42 and carrier 43 to driven shaft 17. Sun gear 31 is held stationary by brake 32, thus providing a reaction member, thereby causing the planet pinions 38 and carrier 37 to rotate in the same direction as ring gear 39 but at a speed less than the ring gear 39. The drum 45 and ring gear 44 rotate in the same direction and at the same speed as carrier 37. As in second gear, the carrier 43 is driven in the same direction as sun gear 41 at a speed less than sun gear 41. However, the ring gear 44 rotates faster in the third speed ratio than in the second speed ratio. Therefore the speed of the carrier 43 is faster in the third speed ratio than in the second speed ratio.

To operate the transmission in the fourth or high forward speed ratio, the brake 32 is disengaged and the clutch 27 is engaged while the clutch 26 remains engaged. The power flow is in a single path from input shaft 11 through the torque converter 12 to drive shaft 13. The power flow is in two paths from drive shaft 13. One path is through drum 24, clutch 26, intermediate shaft 14, sun gear 41, planet pinions 42 and carrier 43 to driven shaft 17. Hub 40 and ring gear 39 are also driven by intermediate shaft 14. The other path is through drum 24, drum 25, clutch 27, drum 29, sun gear 31, planet pinions 38, carrier 37, drum 45, ring gear 44, planet pinions 42 and carrier 43 to driven shaft 17. Sun gear 41, ring gear 39 and sun gear 31 are rotating at the same speed because they are rotated by a common element, that is drive shaft 13. Since both the sun gear 31 and ring gear 39 are input members rotating at the same speed, the planet pinions 38 in mesh with them and the carrier 37 must also rotate at the same speed as the sun gear 31 and ring gear 39. The drum 45 and ring gear 44, driven by the carrier 37, also rotate at the same speed as sun gear 31, ring gear 39 and sun gear 41. Since the sun gear 41 and ring gear 44 are input members rotating at the same speed, the planet pinions 42, carrier 43 and driven shaft 17 must rotate at that same speed. Therefore the overall gearing ratio from drive shaft 13 to driven shaft 17 is one to one.

To operate the transmission in a low reverse speed ratio, the clutch 27 and the brake 46 are engaged. The power flow is in a single path from the input shaft 11 through the torque converter 12, drive shaft 13, drum 24, drum 25, clutch 27, drum 29, sun gear 31, planet pinions 38, ring gear 39, hub 40 intermediate shaft 14, sun gear 41, planet pinions 42, and carrier 43 to driven shaft 17. Since the carrier 37 is held stationary by the brake 46 and drum 45 thus providing a reaction member, the rotation of ring gear 39 and sun gear 41 is in a direction opposite to input shaft 11 and sun gear 31 and at a speed less than sun gear 31. Since the ring gear 44 is held stationary by the brake 46 and drum 45 thus providing a reaction member, the rotation of output carrier 43, due to the planetary action of pinions 42, is in the same direction as sun gear 41 and at a speed less than the input sun gear 41. Therefore, the rotation of driven shaft 17 is opposite to input shaft 11 at a speed less than the input shaft 11.

To operate the transmission in a high reverse speed ratio, the brake 46 is disengaged and the brake 35 is engaged while the clutch 27 remains engaged. The power flow is in a single path from input shaft 11 to drum 29 as in the low reverse speed ratio. The power flow is in two paths from drum 29. One path being from drum 29 through sun gear 30, planet pinions 33, ring gear 36, drum 45, ring gear 44, planet pinions 42 and carrier 43 to driven shaft 17. The other path is from drum 29 through sun gear 31, planet pinions 38, ring gear 39, hub 40, intermediate shaft 14, sun gear 41, planet pinions 42 and carrier 43 to driven shaft 17. Since the carrier 34 is held stationary by the brake 35, the ring gear 36 rotates opposite to sun gear 30 at a speed less than sun gear 30. The carrier 37, being connected to drum 45 and ring gear 36, is rotated in the same direction and at the same speed as ring gear 39. Therefore, the carrier 37 is a rotating reaction member for sun gear 31 and ring gear 39. Due to the rotation of the carrier 37 and the sun gear 31, the ring gear 39 rotates opposite to sun gear 31 at a speed greater than ring gear 36. Sun gear 41 rotates in the same direction and at the same speed as ring gear 39. Since the sun gear 41 and the ring gear 44 rotate opposite to the input shaft 11, the carrier 43 rotates opposite to the input shaft at a speed determined by the speed of the sun gear 41, ring gear 44 and the ratio of the number of teeth on the sun gear 41 to the ring gear 44.

Figure 2:
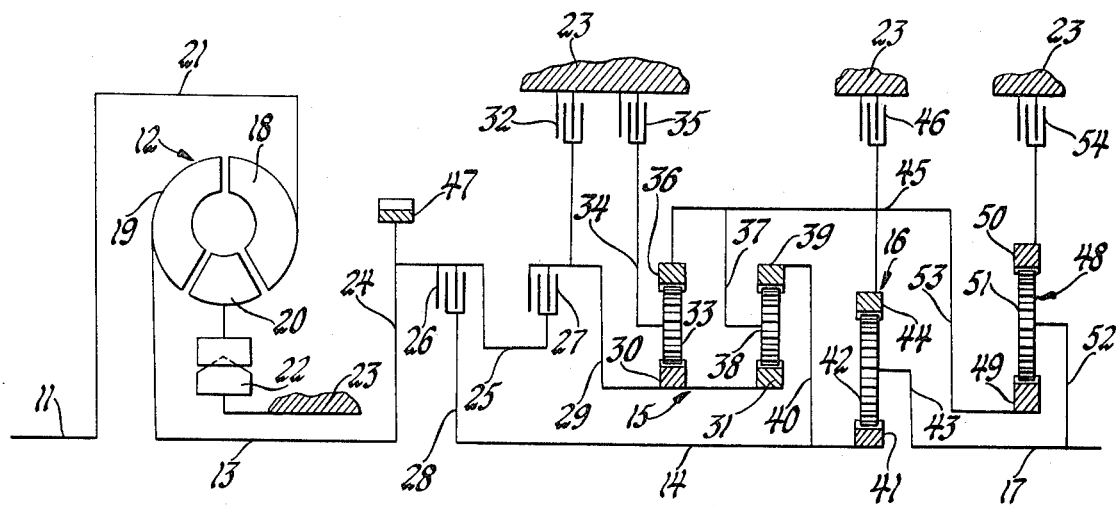
FIG. 2 is a diagrammatic view of the transmission showing a modification.

To obtain further reverse speed ratio coverage, a reverse planetary gear unit, having a speed ratio between the low and the high reverse speed ratios, may be added. FIG. 2 shows the transmission of FIG. 1 modified with the addition of a reverse planetary gear group or unit 48, which has an input sun gear 49, reaction ring gear 50 and a plurality of planet pinions 51, meshing with the sun gear 49 and the ring gear 50, mounted on an output carrier 52. The sun gear 49 is secured to a drum 53 which is connected to the drum 45. The carrier 52 is connected to the driven shaft 17. The ring gear 50 is connected to a reverse brake 54. The reverse brake 54 is a multiple disc type previously described.

The transmission shown in FIG. 2 operates the same as transmission shown in FIG. 1 and described above to produce four forward speed ratios and the high and low reverse speed ratios. To operate the transmission in the additional reverse speed ratio, the clutch 26 and the reverse brake 54 are engaged while the other clutch and brakes are disengaged. The power flow is in a single path from the input shaft 11 through the torque converter 12, drive shaft 13, drum 24, clutch 26, drum 28, intermediate shaft 14, sun gear 41, planet pinions 42, ring gear 43, drum 45, drum 53, sun gear 49, planet pinions 51 and carrier 52 to driven shaft 17. The ring gear 44 rotates opposite to sun gear 41 at a speed less than sun gear 41. Sun gear 49 rotates in the same direction and at the same speed as ring gear 44. Since ring gear 50 is held against rotation, the carrier 52, due to the planetary action, is rotated in the same direction as sun gear 49 at a speed less than sun gear 49. Therefore, the driven shaft 17 rotates opposite to drive shaft 14 at a speed less than drive shaft 14.

Obviously, many modifications and variations of the present invention are possible in light of the above teachings. It is therefore to be understood that within the scope of the appended claims, the invention may be practiced otherwise than as specifically described.

I claim:

1. In a power transmission the combination of a drive shaft, a first planetary gear group having plural input members, plural output members and plural reaction members, a second planetary gear group having an input member, an output member and another member, a driven shaft drive connected to said output member of said second planetary gear group, a first means for interconnecting one input member of said first planetary gear group and the input member of the second planetary gear group, a second means for connecting at least two output members of said first planetary gear group with said another member of said second planetary gear group, a first driving means for selectively operably connecting said drive shaft to said first means, a second driving means for selectively operably connecting said drive shaft to two input members of said first planetary gear group, a first holding means for selectively holding one reaction member of said first planetary gear group from rotation, a second holding means for selectively holding said second means from rotation, a third holding means for selectively holding another reaction member of said first planetary gear group from rotation, said driving and holding means being selectively operable to establish a plurality of single paths and dual paths of power transmission from the drive shaft to the driven shaft.

2. The power transmission defined in claim 1 wherein the selection of said first driving means and said second holding means will establish a single path of power transmission at reduced forward speed ratio from the drive shaft to the driven shaft when power is applied to said drive shaft.

3. The power transmission defined in claim 1 wherein the selection of said first driving means and said first holding means will establish a dual path of power transmission at reduced forward speed ratio from the drive shaft to the driven shaft when power is applied to said drive shaft.

4. The power transmission defined in claim 1 wherein the selection of said first driving means and said third holding means will establish a dual path of power transmission at a reduced forward speed ratio from the drive shaft to the driven shaft when power is applied to said drive shaft.

5. The power transmission defined in claim 1 wherein selection of said second driving means and said second holding means will establish a single path of power transmission at reduced reverse speed ratio from said drive shaft to said driven shaft when power is applied to said drive shaft.

6. The power transmission defined in claim 1 wherein selection of said second driving means and said first holding means will establish a dual path of power transmission at reduced reverse speed ratio from said drive shaft to said driven shaft when power is applied to said drive shaft.

7. The transmission defined in claim 1 wherein selection of said first and second driving means will establish a dual path of power transmission at a one-to-one forward speed ratio from said drive shaft to said driven shaft when power is applied to said drive shaft.

8. In a power transmission the combination of a drive shaft, a first planetary gear group having a first and second sun gear, a first and second ring gear, a first carrier having a plurality of pinions meshing with said first sun and first ring gears and a second carrier having a plurality of pinions meshing with said second sun and second ring gears, said first and second sun gears being rigidly connected, said first carrier and said second ring gear being drive connected, a second planetary gear group having a sun gear, a ring gear and a carrier having a plurality of pinions rotatably mounted therein meshing with said sun and ring gears, said sun gear being drive connected to said first ring gear of said first planetary gear group, said ring gear being drive connected to said first carrier and said second ring gear of said first planetary gear group, a driven shaft drive connected to said carrier of said second planetary gear group, a first driving means for selectively operatively connecting said drive shaft to said sun gear of said second planetary gear group and said first ring gear of said first planetary gear group, a second driving means for selectively operatively connecting said drive shaft to said first and second sun gears of said first planetary gear group, a first holding means selectively operatively connected to said ring gear of said second planetary gear group and said first carrier and said second ring gear of said first planetary gear group, a second holding means selectively operatively connected to said second carrier of said first planetary gear group, a third holding means selectively operatively connected to said first and second sun gears of said first planetary gear group, said driving and holding means being selectively operable to establish a plurality of single paths and dual paths of power transmission from the drive shaft to the driven shaft.

9. The transmission as defined in claim 8, the combination further comprising a third planetary gear group having a sun gear, a ring gear and a plurality of pinion gears rotatably mounted in a carrier and meshing with said sun gear and said ring gear, means for drive connecting said sun gear to the ring gear of the second planetary gear group, means for drive connecting said carrier to the driven shaft, means selectively operable to hold said ring gear of said third planetary gear group.

10. The transmission as defined in claim 8, the combination further comprising a torque converter having an input element, an output element and a reaction element, said input element being drive connected to a suitable power source, said output element being drive connected to said drive shaft, means including a one-way torque establishing device for preventing rotation of said reaction element in one direction.

11. In a power transmission the combination of a drive shaft, a first planetary gear group having plural input members, plural output members and plural reaction members, a second planetary gear group having an input member, an output member and another member, a driven shaft, drive connected to said output member of said second planetary gear group, a first means for interconnecting one input member of said first planetary gear group and the input member of the second planetary gear group, a second means for connecting at least two output members of said first planetary gear group with one of said another member and said output member of said second planetary gear group, a first driving means for selectively operably connecting said drive shaft to said first means, a second driving means for selectively operably connecting said drive shaft to two input members of said first planetary gear group, a first holding means for selectively holding one reaction member of said first planetary gear group from rotation, a second holding means for selectively holding said another member of said second planetary gear group from rotation, a third holding means for selectively holding another reaction member of said first planetary gear group from rotation, said first driving means and said second holding means being selectively operable to establish a forward drive ratio, and said second driving means and said second holding means being selectively operable to establish a reverse drive ratio.

12. In a power transmission the combination of a drive shaft, a first planetary gear group having a first and second sun gear, a first and second ring gear, a first carrier having a plurality of pinions meshing with said first sun and first ring gears and a second carrier having a plurality of pinions meshing with said second sun and second ring gears, said first and second sun gears being rigidly connected, said first carrier and said second ring gear being drive connected, a second planetary gear group having a sun gear, a ring gear and a carrier having a plurality of pinions rotatably mounted thereon meshing with said sun and ring gears, said sun gear being drive connected to said first ring gear of said first planetary gear group, one of said ring gear and said carrier of said second planetary gear group being drive connected to said first carrier and said second ring gear of said first planetary gear group, a driven shaft drive connected to said carrier of said second planetary gear group, a first clutch means for selectively operatively connecting said drive shaft to said sun gear of said second planetary gear group and said first ring gear of said first planetary gear group, a second clutch means for selectively operatively connecting said drive shaft to said first and second sun gears of said first planetary gear group, a first brake means selectively operatively connected to said ring gear of said second planetary gear group, a second brake means selectively operatively connected to said second carrier of said first planetary gear group, a third brake means selectively operatively connected to said first and second sun gears of said first planetary gear group, said first clutch means and said first brake means being selectively operable to establish a forward drive ratio, and said second clutch means and said first brake means being selectively operable to establish a reverse drive ratio.

* * * * *